United States Patent [19]

Fox, III et al.

[11] 4,056,599

[45] Nov. 1, 1977

[54] PROCESS FOR THE RECOVERY OF MAGNESIUM CHLORIDE HYDRATE AND POTASSIUM CHLORIDE FROM CARNALLITE AND BISCHOFITE

[75] Inventors: Joseph M. Fox, III, Lafayette; Bruce D. Degen, Bolinas; Irving Leibson, Alamo, all of Calif.

[73] Assignee: Bechtel International Corporation, San Francisco, Calif.

[21] Appl. No.: 624,028

[22] Filed: Oct. 20, 1975

[51] Int. Cl.² .............................................. C01F 5/30
[52] U.S. Cl. ................................... 423/178; 423/179; 423/208; 423/497
[58] Field of Search .............. 423/157, 159, 163, 497, 423/498, 155, 178; 23/297, 298, 299, 300, 304

[56] References Cited

U.S. PATENT DOCUMENTS

| 3,357,800 | 12/1967 | Gaska | 23/304 |
| 3,833,709 | 9/1974 | Chassagne | 423/157 |
| 3,925,028 | 12/1975 | Lozano | 23/300 |

FOREIGN PATENT DOCUMENTS

| 776,579 | 1/1968 | Canada | 23/300 |
| 1,467,293 | 8/1969 | Germany. | |

Primary Examiner—O. R. Vertiz
Assistant Examiner—Wayne A. Langel
Attorney, Agent, or Firm—Townsend and Townsend

[57] ABSTRACT

Carnallite, comprising principally of $MgCl_2 \cdot KCl \cdot 6H_2O$, with varying amounts of sodium chloride and other impurities, is dissolved in a lower saturated monohydric aliphatic alcohol having from one to four carbon atoms such as methanol, ethanol, propanol, isopropyl alcohol, N-butyl alcohol, secondary-butyl alcohol, iso-butyl alcohol, and tert-butyl alcohol, to dissolve the magnesium chloride therein leaving an insoluble residue of principally potassium chloride, sodium chloride and other materials. The residue is filtered from the solution, dried and stored or further processed. The filtrate, a magnesium chloride hydrate solution is further processed by injecting steam or water into the solution and removing, e.g., evaporating the methanol from the solution leaving an aqueous magnesium chloride hexahydrate brine. The recovered methanol is dried by distillation, condensed and recycled. The brine is stored for subsequent processing or dehydrated to a magnesium chloride dihydrate and granulated for storage and subsequent use.

23 Claims, 1 Drawing Figure

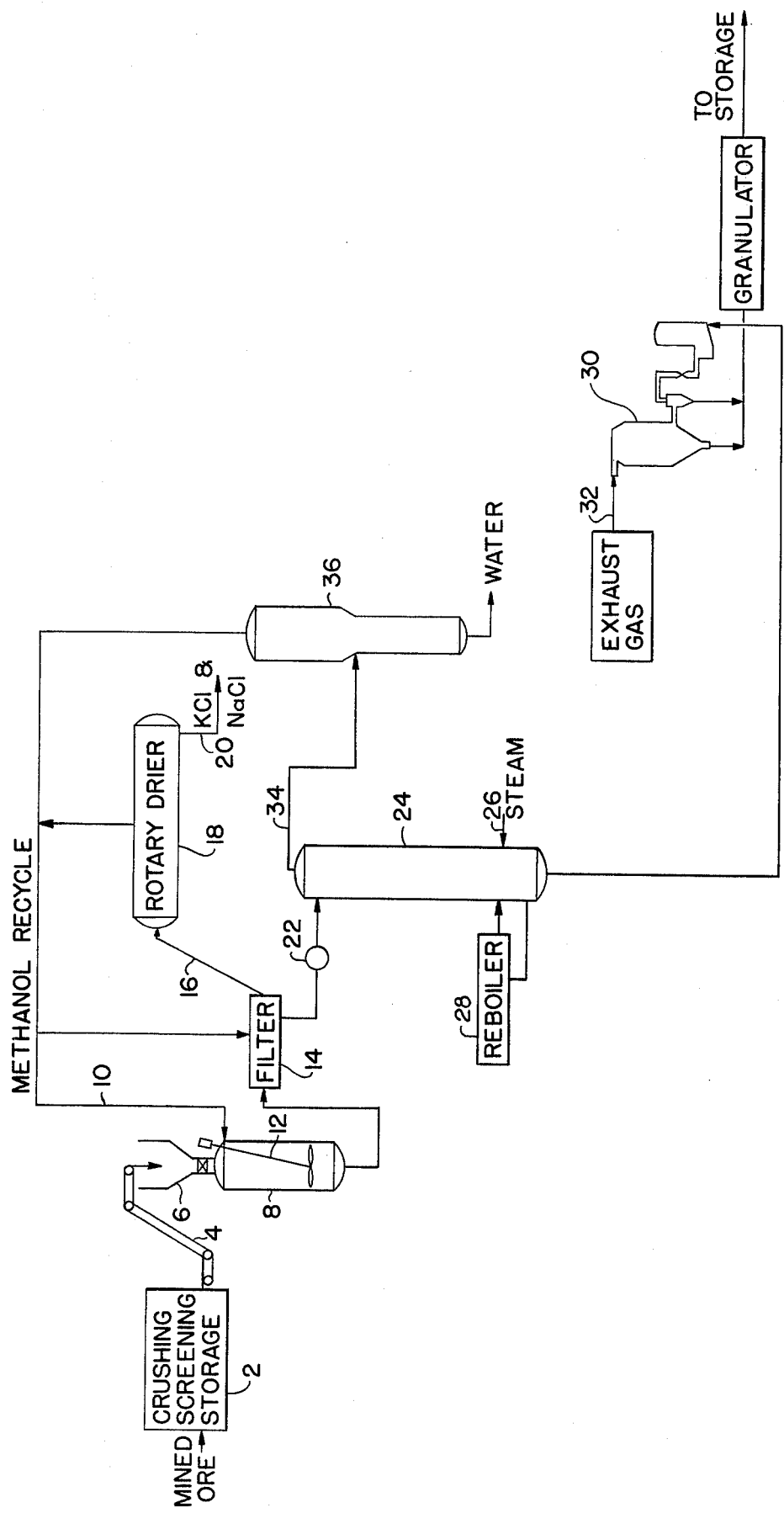
FIG._1.

PROCESS FOR THE RECOVERY OF MAGNESIUM CHLORIDE HYDRATE AND POTASSIUM CHLORIDE FROM CARNALLITE AND BISCHOFITE

BACKGROUND OF THE INVENTION

In certain geographical areas such as in portions of Africa, Europe and South and North America, large carnallite ore deposits consisting of primarily $MgCl_2.KCl.6H_2O$ with varying amounts of sodium chloride and other impurities are an ideal source for the recovery of magnesium chloride, which is then further processed into magnesium metal, and secondarily of potassium chloride for fertilizer manufacture. For some time, attempts have been made to render the carnallite processing more efficient. Carnallite is currently processed by solution in water with recovery of potassium chloride via a fractional crystallization process. Typically, an aqueous magnesium chloride rich brine is discarded during such an operation and the disposal of this can constitute a serious and costly environmental problem as well as a loss of a potentially profitable product.

More recently, new carnallite processes have been disclosed in which the carnallite is selectively separated through the solution of the magnesium chloride in methanol. Exemplary of such proceeses are East German Pat. No. 33,189 and U.S. Pat. No. 3,833,709. In accordance therewith, the methanol-magnesium chloride solution is filtered to separate the insoluble residue, primarily potassium chloride and sodium chloride. The methanol is then recovered, e.g., evaporated from the solution, combined with any methanol recovered from the filter cake and recirculated in a closed system.

In the above-referenced East German patent, the methanol recovery is performed in two steps. Methanol is evaporated from the solution in a first multi-stage vacuum evaporation and thereafter the remaining methanol is evaporated in a second, e.g. spray-drying step. The resulting methanol vapors are condensed in conventional equipment and recycled to the solubilizing step.

The vacuum evaporation, however, has serious drawbacks in that there exists a constant danger of an air-leak which, if present, can result in an explosive mixture. Thus, this process is not well suited for large scale commercial operations because of its safety hazard. Additionally, the drying is difficult to perform because of the economic need to recover essentially all of the methanol and to prevent the discharge of even trace quantities of methanol to the atmosphere because methanol is a toxic pollutant. Recirculating a suitable drying gas such as the exhaust gas of furnaces, boilers, etc. to the adsorptive methanol recovery process disclosed in the East German patent is too expensive to render it commercially feasible.

In the above-referenced U.S. patent, the shortcomings encountered with the process disclosed in the East German patent are largely eliminated. Generally speaking, the U.S. patent contemplates the evaporation of the methanol from the solution at an elevated temperature. The U.S. patent further discloses the addition of water to the solution, however, at a relatively late stage in the evaporation step. As a result, the solution becomes a relatively viscous mass which has a tendency to foul heat transfer surfaces which in turn can seriously interfere with the process. In addition, there may be local overheating of the mass which can lead to the decomposition of the magnesium chloride hydrate into highly corrosive hydrochloric acid and solid magnesium oxide which causes serious fouling of heat transfer surfaces and contaminates the subsequent magnesium chloride product unless removed.

As a refinement to the above-discussed prior art processes, and particularly the one disclosed in the referenced U.S. patent, it has also been contemplated to provide a twostep methanol evaporation in which the solution is concentrated in a first evaporation step and wherein the remainder is subsequently spray-dried in a closed recirculating system operated slighty above atmospheric pressure to avoid the safety hazards encountered in vacuum operations. However, the utility costs, and particularly the refrigeration and gas circulating power costs of operating such a system as well as its initial capital investment are presently too high to render its commercial use economically feasible.

SUMMARY OF THE INVENTION

The present invention is an improvement over prior art processes for recovering magnesium chloride (and potassium chloride) from carnallite ore by dissolving the magnesium chloride in a lower saturated monohydric aliphatic alcohol having from one to four carbon atoms such as methanol, ethanol, propanol, isopropyl alcohol, N-butyl alcohol, secondary-butyl alcohol, isobutyl alcohol, and tert-butyl alcohol, and preferably in methanol, such alcohols being hereinafter sometimes collectively referred to as "methanol". The invention is equally applicable to recovering magnesium chloride from bischofite, an ore which is relatively rich in magnesium chloride hexahydrate, but which has only small amounts of potassium chloride.

For the purposes of this specification and the claims, the term "carnallite" therefore also includes bischofite. Furthermore, the term "magnesium chloride hydrate" as used in the specification and the claims includes all occurring magnesium chloride hydrates such as magnesium chloride dihydrate, tetrahydrate or hexahydrate.

Generally speaking, the present invention contemplates the addition of water to the magnesium chloride-methanol solution (hereinafter "solution"), either in its liquid form but preferably in the form of steam, at an early stage in the methanol evaporation and preferably at or prior to the beginning thereof. A sufficient quantity of water (which, for the purposes of this application and the claims includes water in any of its states unless otherwise stated) is injected to displace the methanol and to transform the solution into an aqueous magnesium chloride brine upon the complete evaporation of the methanol. The brine is then readily further processed by storing and using it directly in the manufacture of magnesium metal or by dehydrating the brine to provide granular magnesium chloride dihydrate for the subsequent manufacture into magnesium metal.

As in the past, methanol is recovered from both the filter cake (comprising the methanol insoluble residue in the ore, primarily potassium chloride) and from the solution itself. The methanol is recovered from the solution by passing it into a vaporizer where the steam is injected for direct contact with the solution. Thus, the steam is employed both to furnish the required water and to heat the solution so that the methanol can be efficiently evaporated. Methanol vapor and steam are drawn off the vaporizer and sent to a methanol distillation dryer for recovery of pure methanol. This methanol is combined with methanol recovered from the filter cake, condensed and recirculated.

In an alternative embodiment, rectification stages may be added to the top of the vaporizer above its feed point, and reflux provided so that a purified methanol overhead is obtained without a separate distillation dryer. This alternative requires increased reboiling of the solution in the vaporizer.

The aqueous brine obtained from the vaporizer is then sent to brine storage or spray-dried, granulated and sent to dry storage.

As contrasted with prior art methanol recovery systems employing either no water or water added at a relatively late stage in the evaporation process, the present invention greatly reduces both operating costs and capital investment, particularly when injecting steam prior to the methanol evaporation. For example, in a 600,000 ton per year magnesium chloride dihydrate manufacturing facility, this results in a reduction in the total product costs of about $14 per ton of dihydrate for a product which presently sells in the vicinity of between $50 and $70 per ton. In addition to the lower total product costs, the construction of such a plant has a capital investment of about $10,000,000 less than plants employing a direct evaporation of methanol from the solution with or without adding water during the later stages of the methanol evaporation.

Furthermore, the presence of water assists in the removal of methanol and prevents the formation of a difficult to handle, surface-fouling and easily overheated, highly viscous mass, resulting from some of the prior art methanol evaporation processes. This invention renders the process commercially feasible, and reduces maintenance costs and possible hazards. Thus, the present invention is a substantial improvement over past processes.

BRIEF DESCRIPTION OF THE DRAWING

The drawing is a schematic flow diagram which illustrates the principal features of the process of the present invention.

DESCRIPTION OF THE PREFERRED EMBODIMENTS

Referring to the drawing, carnallite ore is conventionally crushed and screened at 2 by passing it, for example, through a 40 mesh screen and a conveyor 4 deposits the crushed ore in a hopper 6 of a methanol dissolver 8. Methanol is introduced into the dissolver via a methanol supply line 10 at as low a ratio as possible to reduce operating costs, at present a ratio of about one part methanol to one part ore (by weight) is preferred. The ore and methanol are mixed by an agitator 12 to dissolve the magnesium chloride hydrate in the methanol. The dissolver is operated at a pressure slightly above atmospheric pressure and at a temperature of about 104° F (40° C). However, higher temperatures may be utilized as long as the equipmment is designed to operate at the correspondingly elevated pressures. An inert gas is preferably employed in the hopper 6 to purge oxygen intermixed with the ore and to maintain the superatmospheric pressure. The elimination of oxygen prevents or at least substantially reduces the corrosion of carbon steel equipment in contact with subsequently prepared aqueous solutions. An average residence time for the ore of approximately five minutes in the dissolver is employed to form a solution comprised of methanol and magnesium chloride hydrate. Insoluble residue, primarily potassium chloride but further including sodium chloride (NaCl) and other impurities is also present in the slurry leaving the dissolver vessel 8.

From dissolver 8 the slurry is pumped to a solid-liquid separation device 14 (e.g., a filter centrifuge, etc.) which may be of any suitable construction; presently, a rotary pressure filter is preferred. The magnesium chloridemethanol solution is recovered as filtrate and a potassium chloride-rich filter cake is produced. In the filter, the cake is preferably washed with methanol to dissolve and rinse therefrom any magnesium chloride that may be present. Spent wash can be returned to dissolver 8 or combined with the filtrate. A conveyor 16 carries the filter cake from the filter to a rotary dryer 18 which is heated, preferably with 150 psig steam. In the dryer, the cake is contacted with recirculating inert sweep gas containing about 40% methanol to evaporate methanol remaining in the cake conveyed to the dryer. The sweep gas leaving the dryer has around 70% methanol and is subsequently treated to recover the methanol for recirculation by compressing and cooling it to condense part, e.g., about 30% of the methanol in it. The recovered methanol is recirculated to the dissolver while the remaining gas is reused as a sweep gas for the dryer. For simplicity, the drawing only illustrates a direct recirculation of the methanol and does not show the sweep gas circuit.

The dried cake, i.e., potassium chloride, sodium chloride and other impurities contains no more than about 0.1% methanol and is transported from the dryer 18 by a conveyor 20 to storage. It may optionally be processed through a froth flotation purification system (not shown in the drawing) for potassium chloride recovery.

The filtrate from filter 14 is heated to about 145° F (63° C) in a steam heater 22 and then sent to a methanol stripping or evaporating vessel 24. Sufficient stripping steam is admitted to the vessel through a steam line 26 to maintain a water balance, and form a brine having a relatively low viscosity. The remainder of the heat required to evaporate the methanol is supplied by a forced circulation reboiler 28 using, preferably, 150 psig steam as a heating medium. The temperature in the stripping vessel is maintained at a sufficiently low temperature to avoid the decomposition of the magnesium chloride hexahydrate.

As the methanol passes down through stripping vessel 24 it is evaporated, the methanol in the solution is displaced by water and the solution is converted to an aqueous brine, normally a magnesium chloride hexahydrate brine unless relatively high temperature and pressure conditions cause the formation of a lower hydrate such as a tetra or a dihydrate. The steam addition to the stripping vessel is adjusted so that there is an ultimate free water content of about 25% by weight of the solution, (or about 33% by weight of the magnesium chloride hexahydrate) and a $MaCl_2$ content of about 35% by weight (based on the anhydrous magnesium chloride). The aqueous magnesium chloride brine recovered from the stripping vessel is sent directly to storage or to a spray-dryer 30 for dehydration of the brine to magnesium chloride dihydrate ($MgCl_2.2H_2O$).

Since the concentrated brine is for all practical purposes, methanol-free, it can be spray-dried using the hot exhaust gases of an adjoining utility plant, for example, by introducing the gases through an inlet 32 into the spray dryer. Thereafter, the moisture carrying gases can be discharged to the atmosphere without further treatment. The great advantage of drying the brine in this manner is that no methanol is emitted into the atmosphere with the exhaust gases and no need exists to recirculate the drying gases to the spray-dryer. Thus, the drying process is non-polluting and also relatively inexpensive because available exhaust gas such as from an adjoining utility plant can be utilized.

Evaporated methanol together with some water, normally no more than about 10% by weight, is withdrawn from the upper portion of the stripping vessel and sent through a conduit 34 to a methanol/water splitter 36 for dehydration and the recovery of the methanol. The methanol/water splitter overhead temperature is maintained at about 165° F (74° C), and the condensed dry methanol is recirculated to dissolver 8 and filter 14. Water recovered in the splitter is disposed of or sent to the upper portion of the stripping vessel as a wash to prevent salt carryover. Alternatively, the water may be used to dilute the stripper feed or it may be employed as boiler feed water for the production of steam.

The following example further describes the process of the present invention.

EXAMPLE 1

A plant yielding 6000,000 tons of $MgCl_2.2H_2O$ per year receives 387,000 lbs. (193.5 tons) per hour of Congo carnallite ore which has the following elemental breakdown:

| Component | Weight % |
|---|---|
| Mg | 8.34 |
| Cl | 38.00 |
| K | 13.57 |
| Na | 0.86 |
| Br | 0.47 |
| $H_2O$ | 38.69 |
| TOTAL | 99.93 |
| Trace Contaminants - ppm | |
| Li | 0.2 |
| Ba | 1 |
| $SO_4$ | 240 |
| Ca | 155 |
| B | .04 |
| which is roughly equivalent to: | |
| Component | Weight % |
| $MgCl_2.6H_2O$ | 71.7 |
| KCl | 26.2 |
| NaCl | 2.1 |
| TOTAL | 100.0 |

The ore is crushed and screened with a 3% loss, yielding 375,000 lbs. of ore per hour. 375,000 lbs. of methanol per hour is introduced into methanol dissolver 8, yielding 750,000 lbs. of solution and insolubles (including impurities not accounted for in this example) per hour, which is fed to filter 14. The filter yields 641,550 lbs. per hour of filtrate (comprised of 263,500 lbs. per hour of $MgCl_26H_2O$, and 378,050 lbs. per hour of methanol plus minor impurities), and 116,100 lbs. per hour of filter cake. 89,370 lbs. per hour of 50 psig steam is introduced into stripping vessel 24 while 352,480 lbs. of an aqueous magnesium chloride hexahydrate brine are withdrawn from the vessel and passed to spraydryer 30 which in turn yields 176,800 lbs. per hour of a solid product comprised of about 170,100 lbs. per hour of magnesium chloride dihydrate. Methanol is withdrawn from the stripping vessel and separated from the water in splitter 36 at an hourly rate of approximately 369,000 lbs. Methanol is further withdrawn from rotary dryer 18 at an hourly rate of approximately 8,200 lbs. This methanol is combined with methanol from splitter 36 and recirculated to the dissolver 8 and the filter 14. The brine withdrawn from the stripping vessel has the following composition:

| Component | $MgCl_2.6H_2O$ Slurry Weight % |
|---|---|
| $MgCl_2.6H_2O$ | 74.8 |
| KCl | 0.1 |
| NaCl | 0.3 |
| $H_2O$ | 24.9 |
| TOTAL | 100.0 |

The finish dried filter cake recovered from the rotary dryer has the following composition:

| Component | Raw KCl - Dried Weight % |
|---|---|
| $MgCl_2.6H_2O$ | 5.4 |
| KCl | 93.6 |
| NaCl | 1.0 |
| $CH_3OH$ | 0.1 |
| TOTAL | 100.0 |

EXAMPLE 2

The same quantities of ore, methanol, filtrate and filter cake as in example 1 are produced and introduced into the stripping vessel and the rotary dryer, respectively. The methanol recovery is the same as in example 1. The aqueous brine, however, is directly sent to storage for later processing into magnesium metal. The brine comprises approximately 263,500 lbs. per hour of magnesium chloride hexahydrate and 89,080 lbs. per hour of water plus impurities.

We claim:

1. A process for the recovery of the principal constituents of carnallite comprising the steps of contacting the cornallite with a lower saturated monohydric aliphatic alcohol having from one to four carbon atoms to form an alcohol-magnesium chloride hydrate solution and insoluble residue including potassium chloride; separating the residue from the solution; injecting water into the solution in an amount sufficient to form an aqueous magnesium chloride hydrate brine upon the removal of the alcohol from the solution; evaporating substantially all of the alcohol from the solution in the presence of the injected water to thereby form the aqueous brine; and reusing the previously evaporated alcohol for dissolving further magnesium chloride hydrate from the carnallite.

2. A process according to claim 1 including the step of heating the solution before evaporating the alcohol.

3. A process according to claim 2 wherein the step of injecting the water comprises the step of injecting steam into the solution to thereby simultaneously perform at least part of the step of heating the solution.

4. A process according to claim 1 including the step of drying the aqueous brine to form a dried magnesium chloride hydrate.

5. A process according to claim 4 wherein the drying step includes the step of spraying the aqueous brine into a heated gas to form a moisture carrying gas, thereafter discharging the moisture carrying gas into the atmosphere, the collecting the spray-dried magnesium chloride hydrate.

6. A process according to claim 1 wherein the step of separating the residue comprises the step of filtering the residue from the solution to form a potassium chloride-rich filter cake, and including the step of washing the filter cake with the alcohol to leach therefrom additional undissolved magnesium chloride hydrate.

7. A process according to claim 6 including the step of heating the filter cake after the washing step, and including the step of collecting alcohol evaporated from the heated filter cake, and recirculating the collected alcohol for dissolving further magnesium chloride hydrate from the carnallite.

8. A process for recovering magnesium chloride hydrate from carnallite comprising the steps of dissolving the magnesium chloride hydrate in a lower saturated monohydric aliphatic alcohol having from one to four carbon atoms by contacting the carnallite with the alcohol, injecting water into the solution, and evaporating the alcohol from the solution, the step of injecting the water being performed before a major portion of the alcohol has been evaporated.

9. A process according to claim 8 including the step of injecting a sufficient amount of water into the solution to form an aqueous, magnesium chloride hydrate brine having a relatively low viscosity.

10. A process according to claim 9 including the step of injecting an amount of water equal to approximately 33% by weight of the magnesium chloride hydrate.

11. A process according to claim 8 wherein the step of injecting the water is performed before commencing the step of evaporating the alcohol.

12. A process according to claim 11 including the step of heating the alcohol to facilitate the step of evaporating the alcohol.

13. A process for the recovery of magnesium chloride hydrate from carnallite comprising the steps of dissolving the magnesium chloride hydrate in a lower saturated monohydric aliphatic alcohol having from one to four carbon atoms by contacting the carnallite with the alcohol, removing from the solution the alcohol and substituting therefor water to form an aqueous magnesium chloride hydrate brine, and evaporating water from the aqueous brine in a heated gas and thereafter discharging the gas including moisture withdrawn from the brine to the atmosphere.

14. A process according to claim 13 wherein the step of substituting water comprises the step of adding water to the solution in an amount sufficient to form a relatively low viscosity brine.

15. A process according to claim 14 wherein the step of adding the water comprises the step of adding water to the solution in an amount of approximately 33% by weight of the magnesium chloride hydrate in the solution.

16. A process according to claim 14 including the step of combusting a fuel to generate heat and an exhaust gas for discharge to the atmosphere, using the heat to raise the temperature of the solution and thereby evaporate the alcohol from the solution, and wherein the step of evaporating the water comprises the step of contacting the brine with the exhaust gas and thereafter discharging the exhaust gas directly to the atmosphere.

17. A process for the recovery of magnesium chloride hydrate from carnallite comprising the steps of contacting the carnallite with a lower saturated monohydric aliphatic alcohol having from one to four carbon atoms to thereby dissolve the magnesium chloride hydrate in the alcohol, and removing from the solution substantially all of the alcohol and substituting therefor a sufficient amount of water to form an aqueous magnesium chloride hydrate brine.

18. A process according to claim 17 wherein the step of substituting water comprises the step of adding water to the solution before a major portion of the alcohol has been removed from the solution.

19. A process according to claim 17 wherein the step of substituting water comprises the steps of adding water to the solution, and thereafter separating the alcohol.

20. A process according to claim 17 wherein the step of substituting water comprises the step of adding steam to the solution.

21. A process for the recovering of magnesium chloride hydrate from carnallite comprising the steps of dissolving the magnesium chloride hydrate in a lower saturated monohydric aliphatic alcohol having from one to four carbon atoms by contacting the carnallite with the alcohol, removing from the solution substantially all of the alcohol and substituting therefor water to form an aqueous magnesium chloride hydrate a slurry by heating the solution and withdrawing the alcohol as it evaporates, and adding a sufficient amount of water to form a brine having a relatively low viscosity, providing a heated gas, contacting the brine with the heated gas to thereby remove water from the brine and form an essentially dry magnesium chloride hydrate, and discharging the gas including water carried therein directly into the atmosphere.

22. A process according to claim 21 including the step of filtering the solution before the step of substituting to remove therefrom insoluble residue including potassium chloride, removing from the residue substantially all alcohol present therein, and dissolving additional magnesium chloride hydrate from the carnallite with the alcohol removed from the brine.

23. A process according to claim 21 wherein the step of dissolving comprises the step of contacting the carnallite with the alcohol for no more than about 5 minutes.

* * * * *